Figure 1:
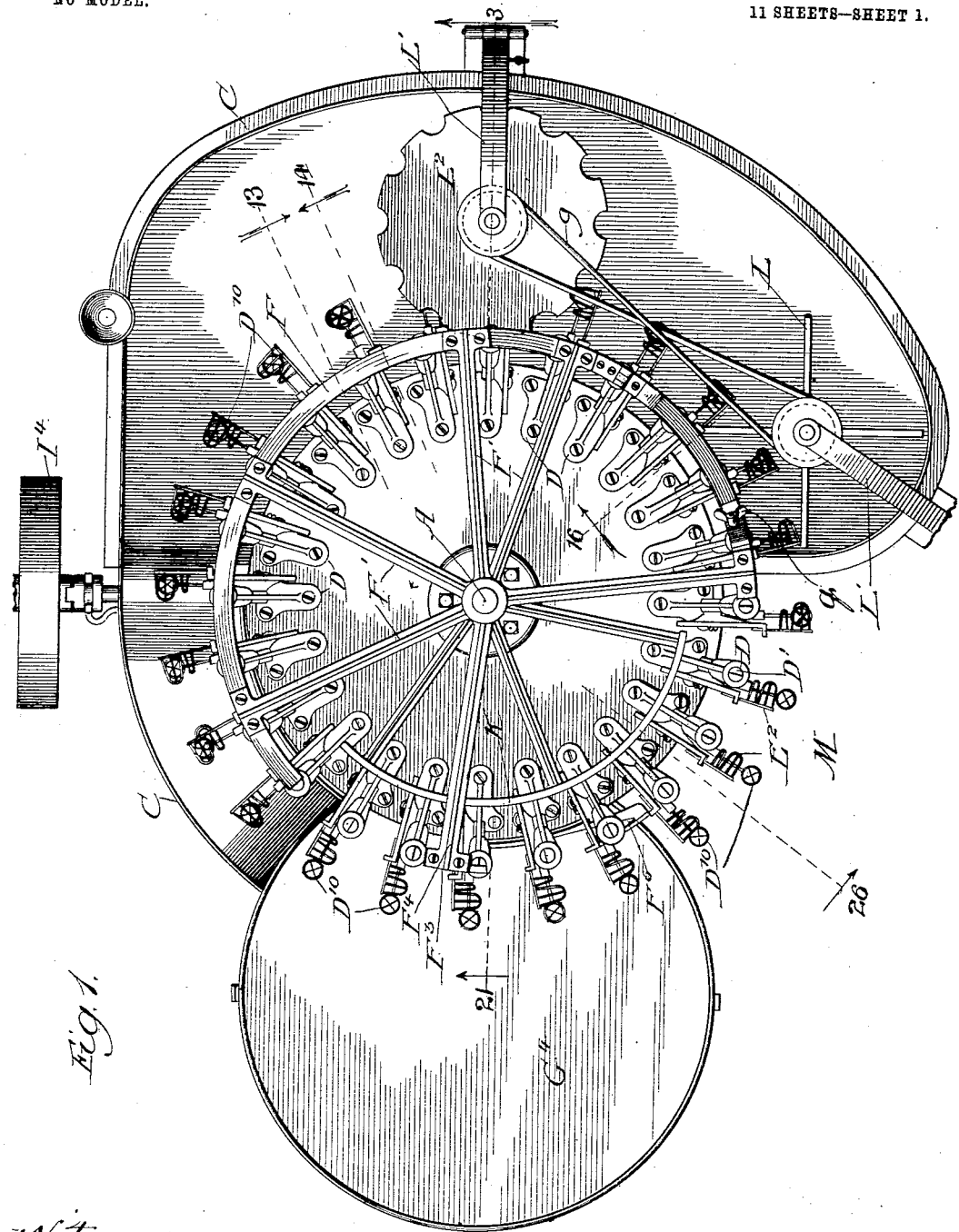

No. 751,730. PATENTED FEB. 9, 1904.
S. J. HICKS.
COATING MACHINE.
APPLICATION FILED JUNE 8, 1900.
NO MODEL. 11 SHEETS—SHEET 1.

Witnesses:

Inventor:
Simeon J. Hicks,

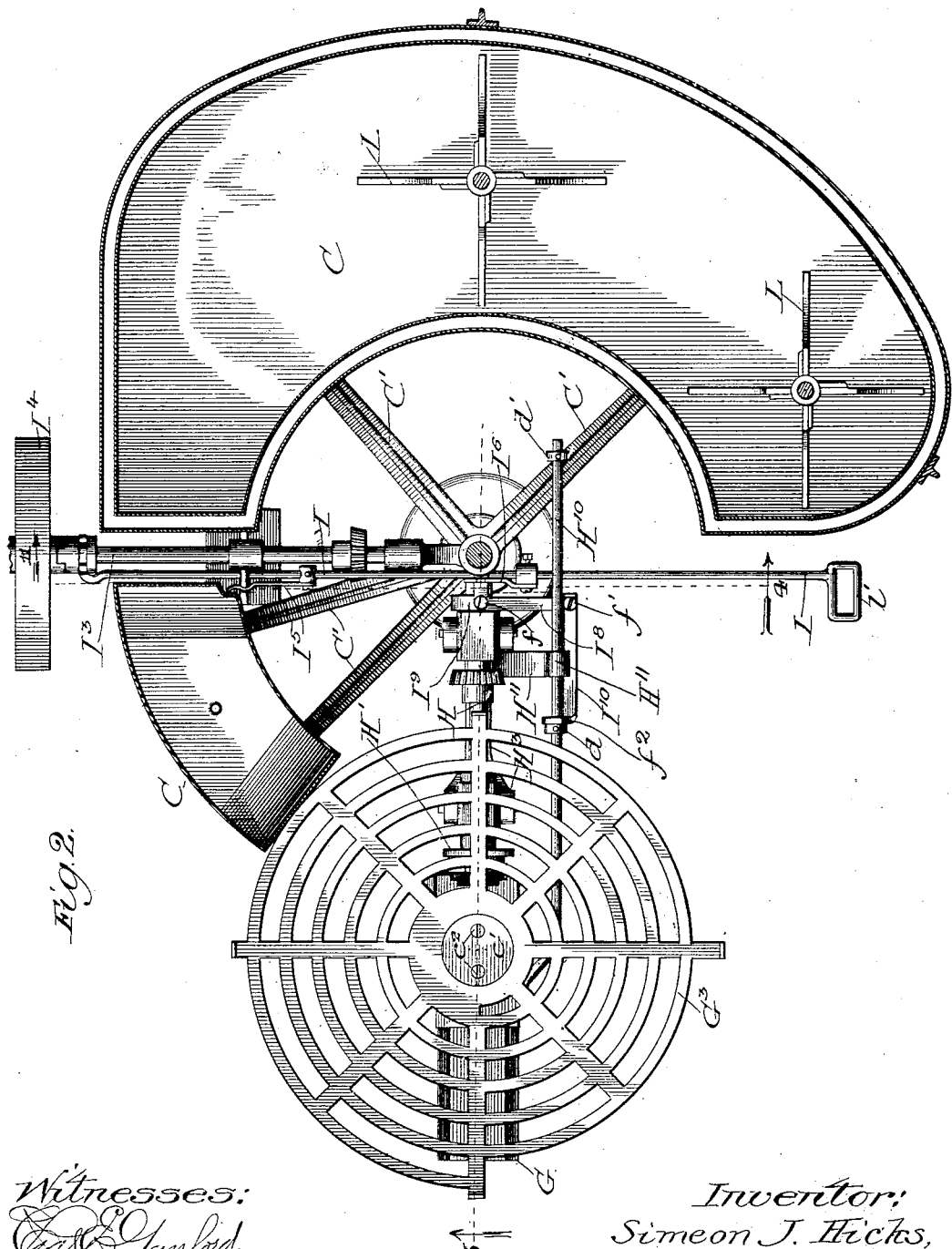

No. 751,730. PATENTED FEB. 9, 1904.
S. J. HICKS.
COATING MACHINE.
APPLICATION FILED JUNE 8, 1900.
NO MODEL. 11 SHEETS—SHEET 3.
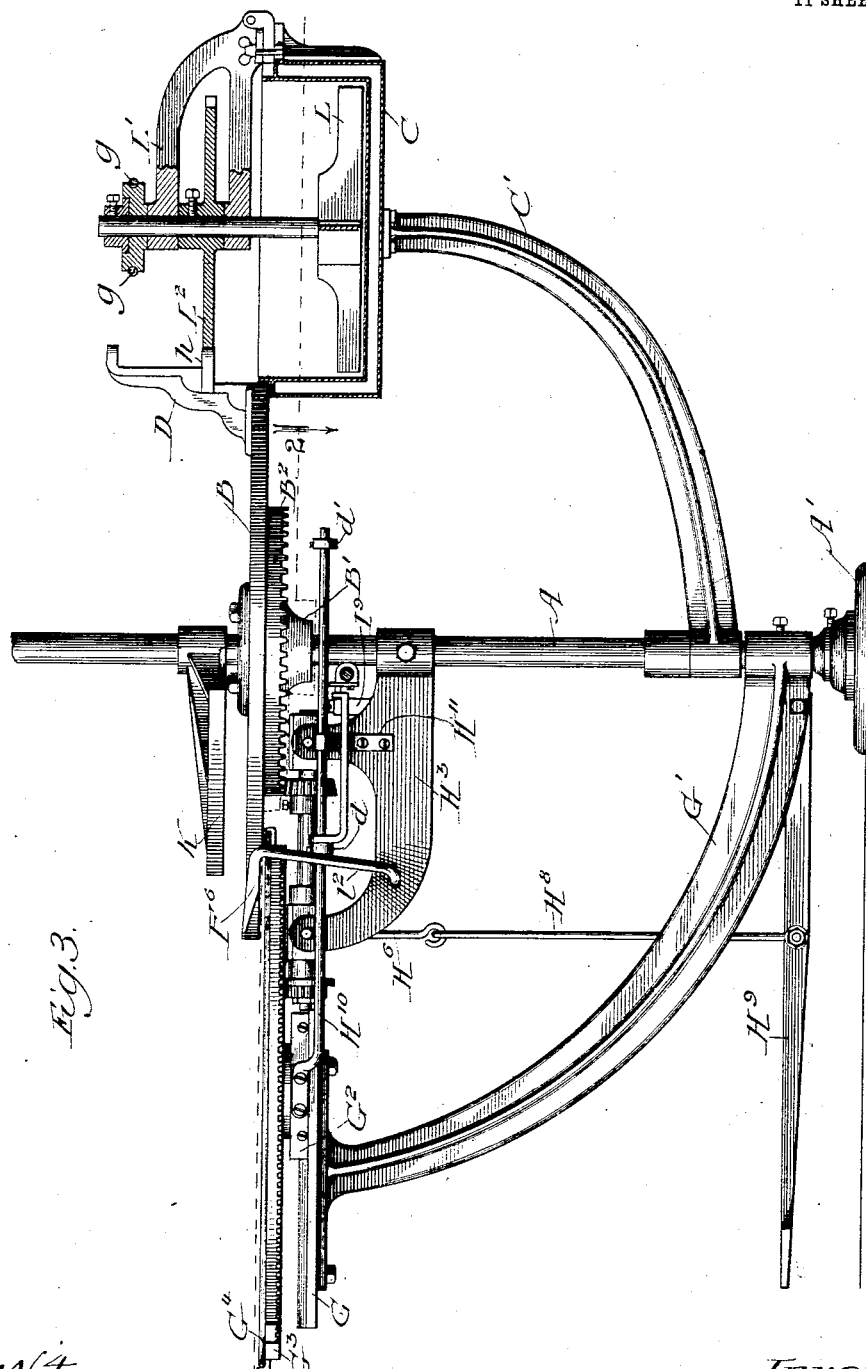

No. 751,730. PATENTED FEB. 9, 1904.
S. J. HICKS.
COATING MACHINE.
APPLICATION FILED JUNE 8, 1900.
NO MODEL. 11 SHEETS—SHEET 4.
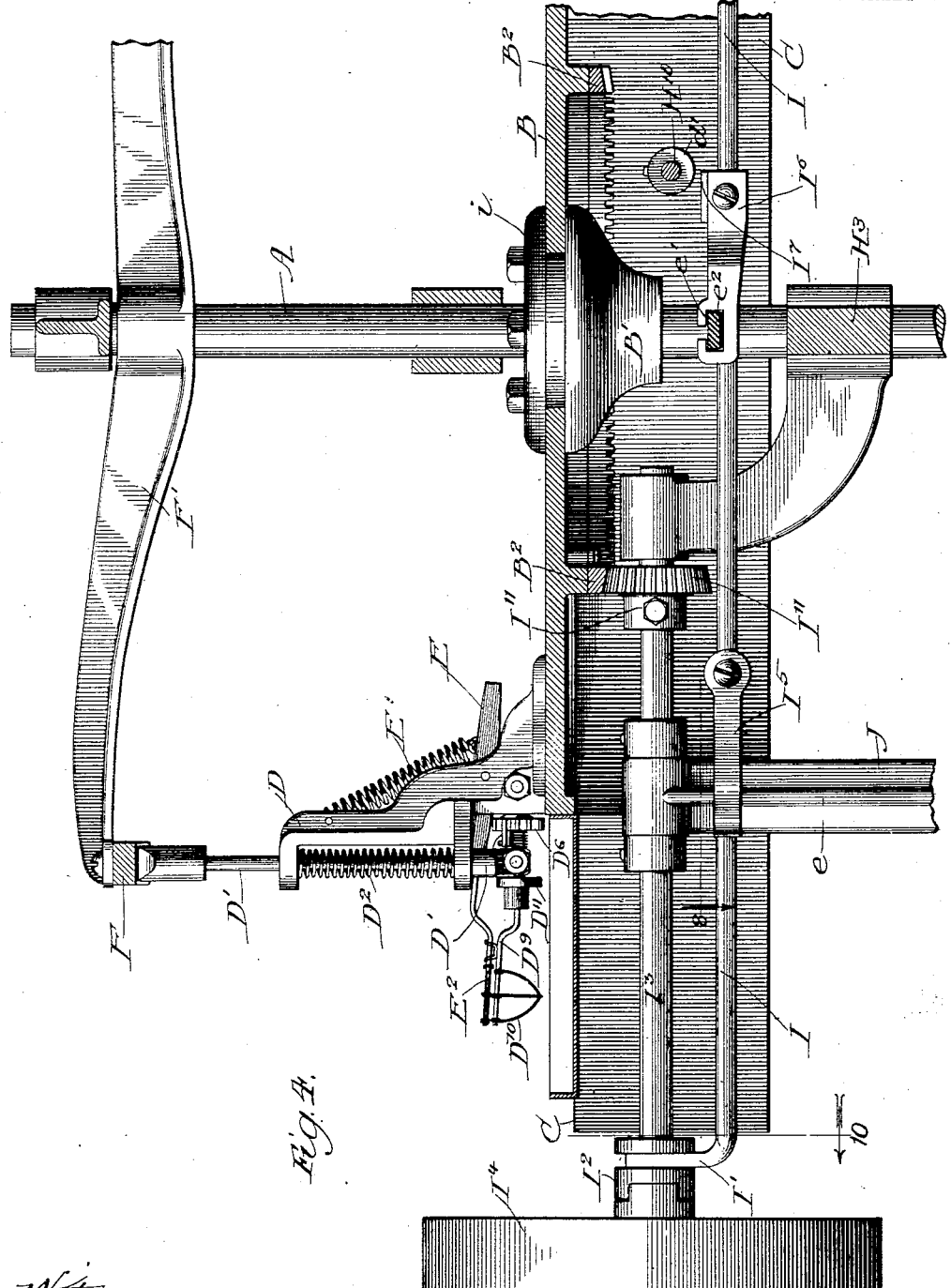
Witnesses:
Inventor
Simeon J. Hicks,

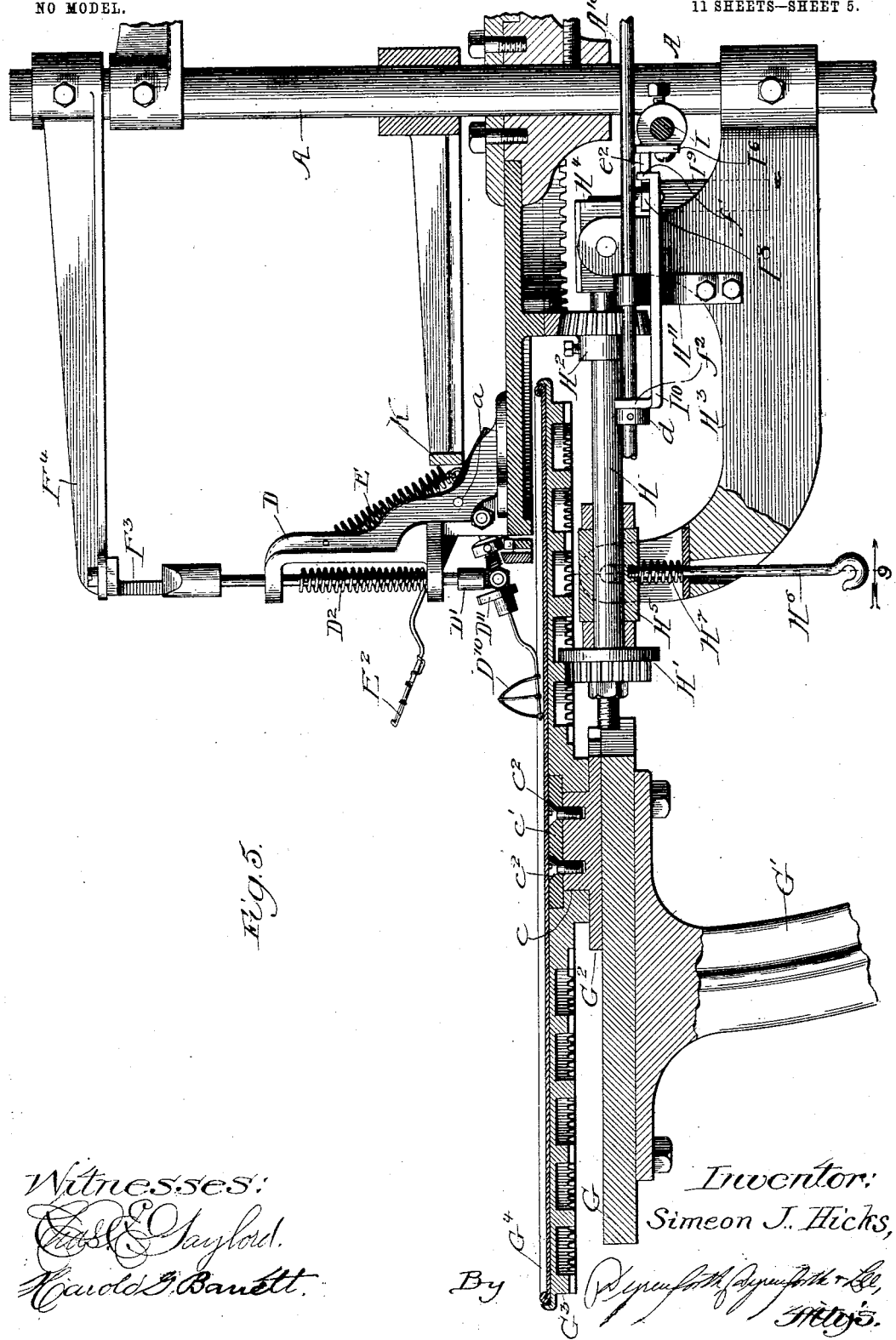

No. 751,730. PATENTED FEB. 9, 1904.
S. J. HICKS.
COATING MACHINE.
APPLICATION FILED JUNE 8, 1900.
NO MODEL. 11 SHEETS—SHEET 6.
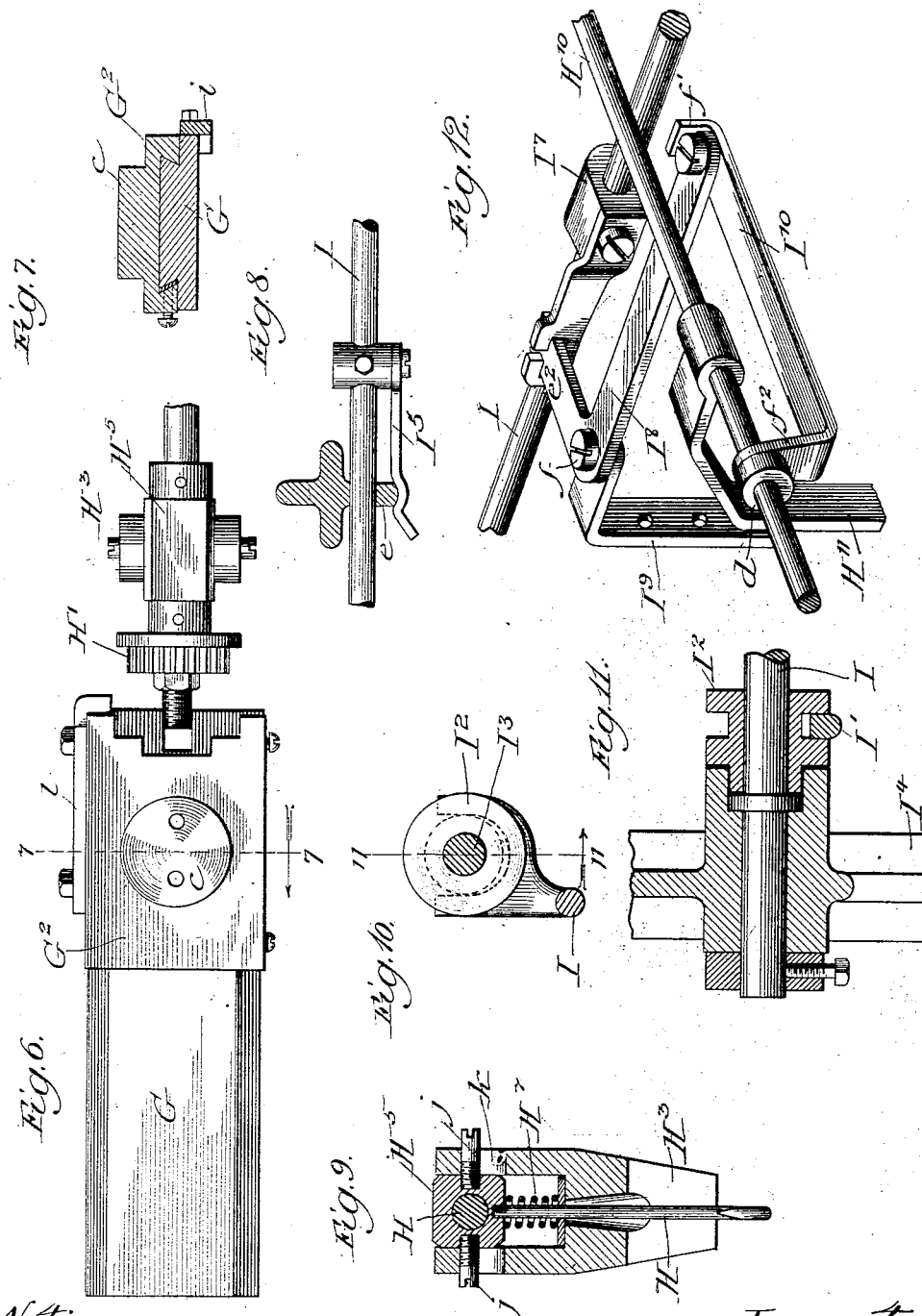
Witnesses:
Inventor,
Simeon J. Hicks,

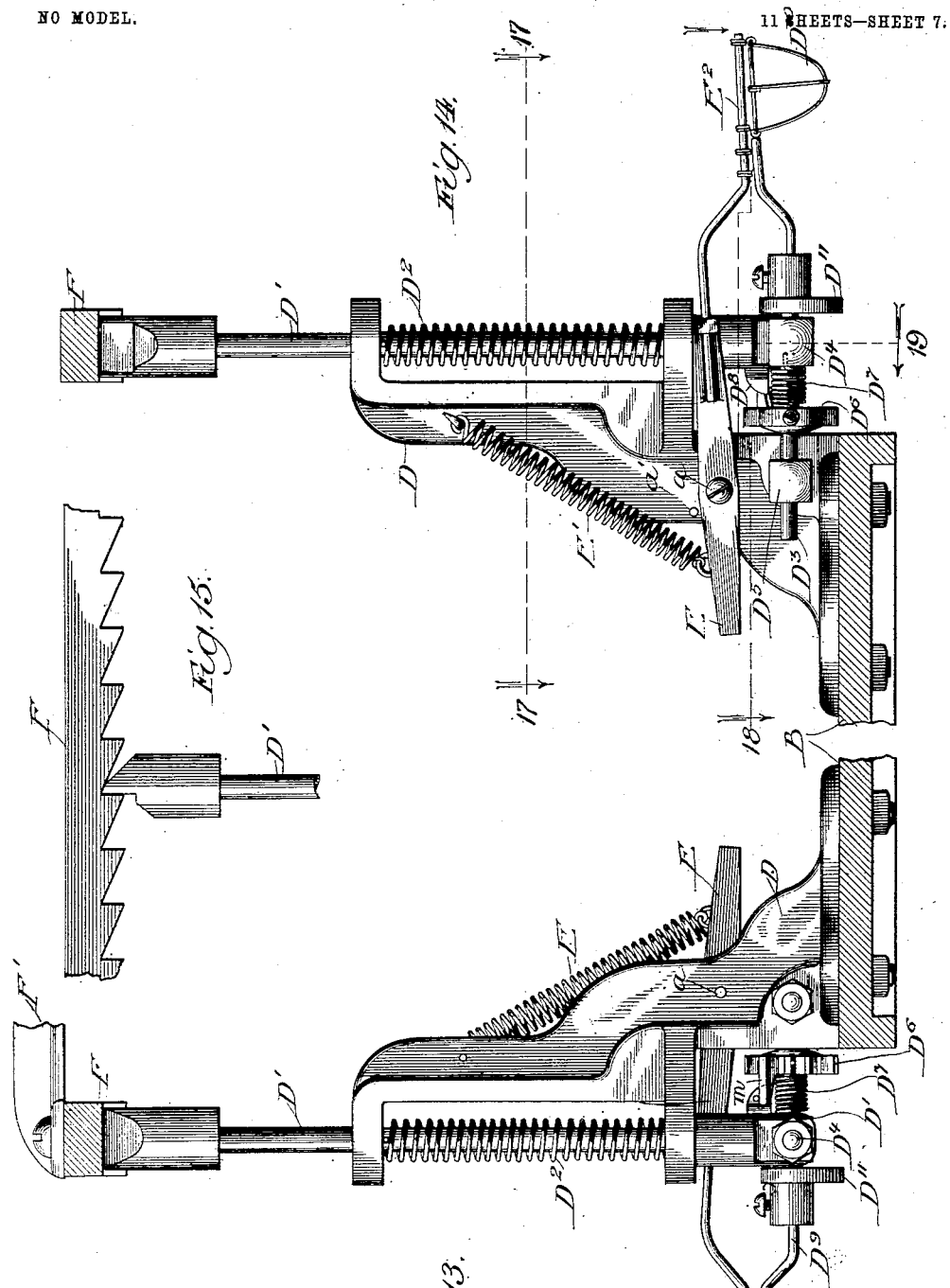

No. 751,730. PATENTED FEB. 9, 1904.
S. J. HICKS.
COATING MACHINE.
APPLICATION FILED JUNE 8, 1900.
NO MODEL. 11 SHEETS—SHEET 8.
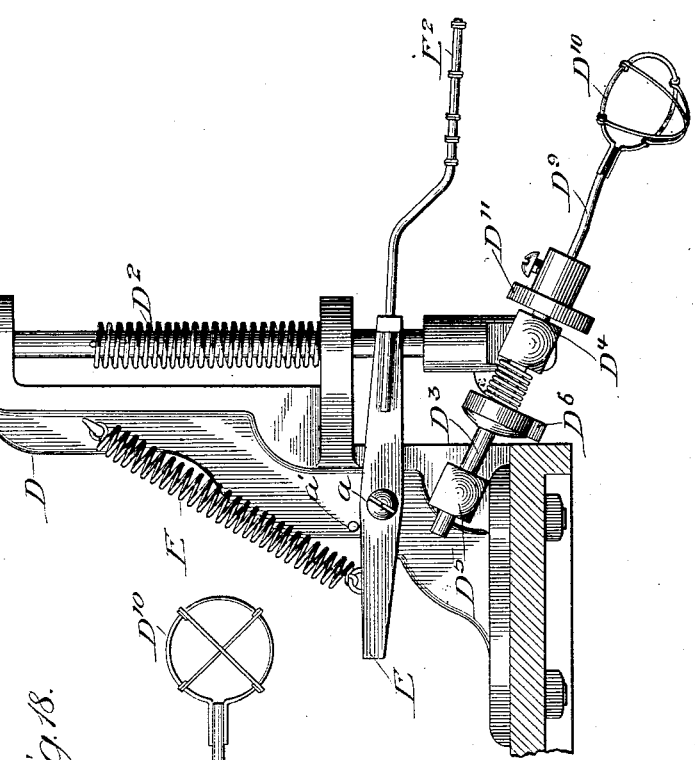
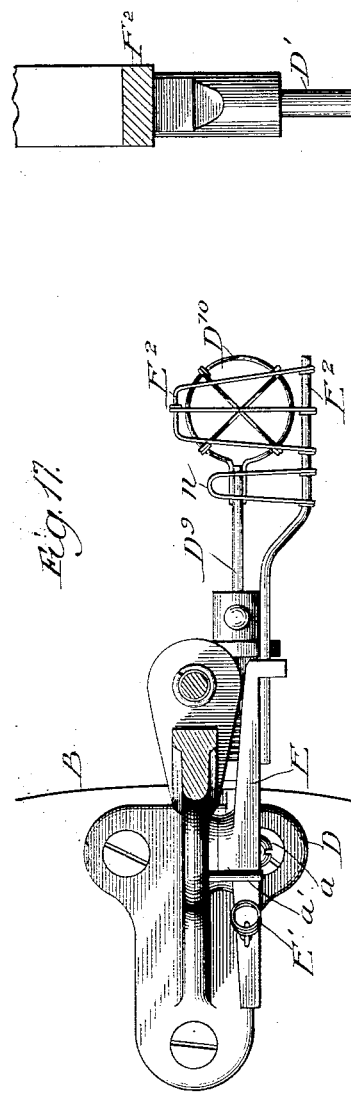
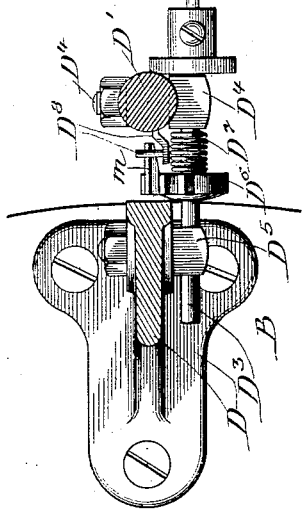
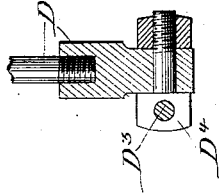
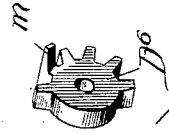
Witnesses:
Chas E Gaylord
Harold G Barrett
Inventor:
Simeon J. Hicks,
By Dyrenforth, Dyrenforth & Lee
Attys.

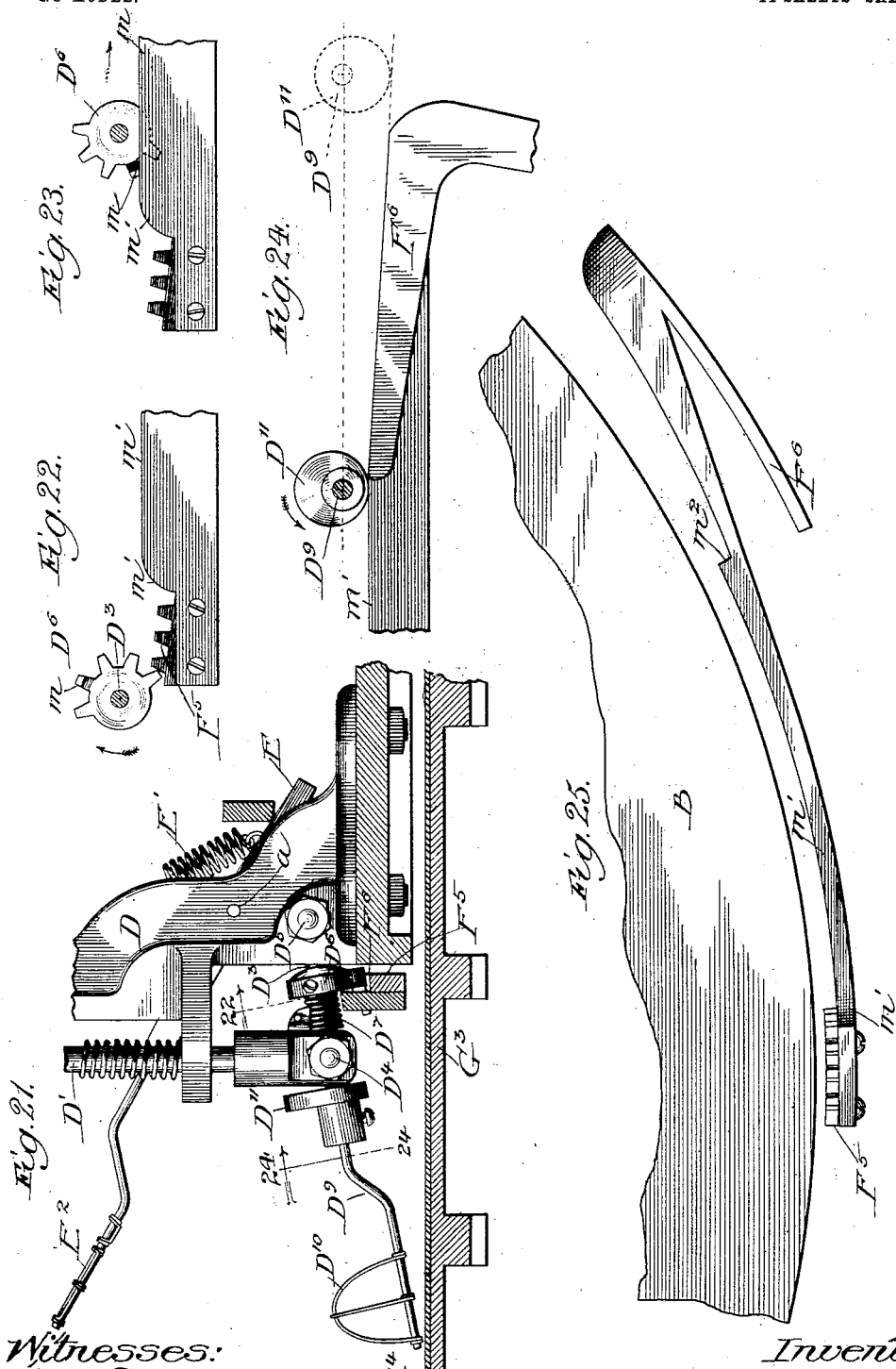

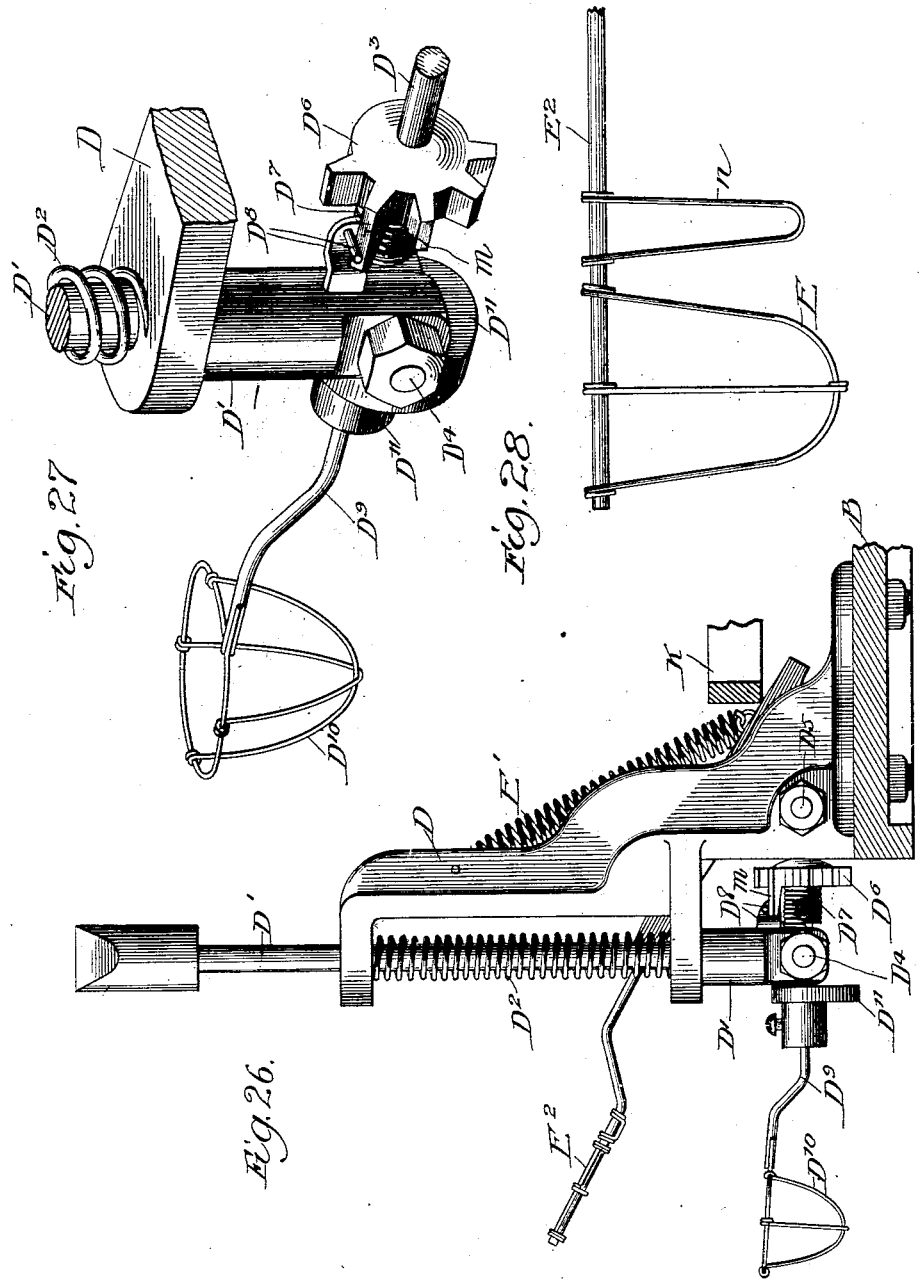

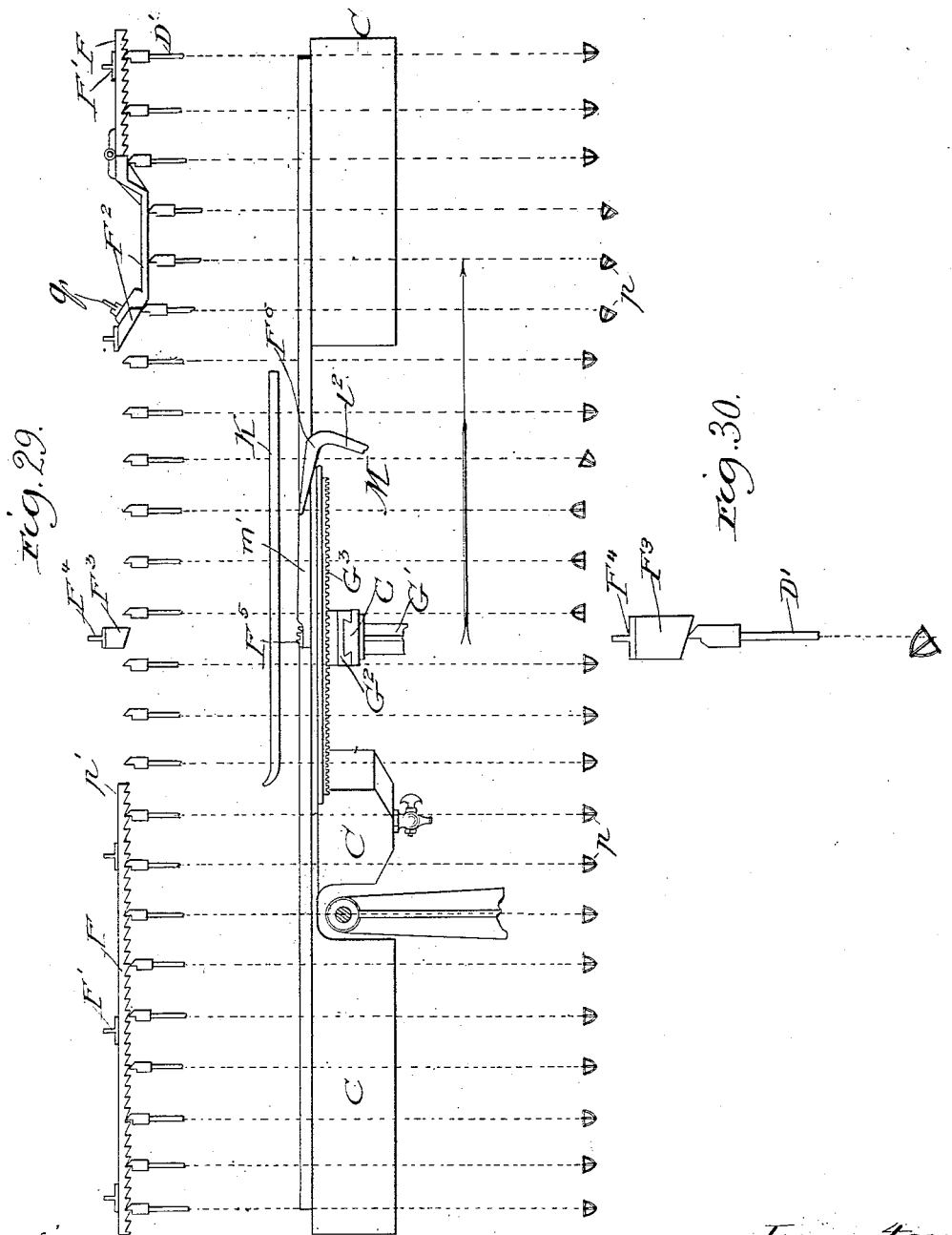

No. 751,730.   Patented February 9, 1904.

UNITED STATES PATENT OFFICE.

SIMEON J. HICKS, OF CHICAGO, ILLINOIS, ASSIGNOR TO CORDELIA S. HICKS, OF CHICAGO, ILLINOIS.

COATING-MACHINE.

SPECIFICATION forming part of Letters Patent No. 751,730, dated February 9, 1904.

Application filed June 8, 1900. Serial No. 19,589. (No model.)

*To all whom it may concern:*

Be it known that I, SIMEON J. HICKS, a citizen of the United States, residing at Chicago, in the county of Cook and State of Illinois, have invented a new and useful Improvement in Coating-Machines, of which the following is a specification.

My invention relates particularly to machines for coating creams or other bodies with chocolate or other coating, though the invention is not limited to this use.

My primary object is to provide a machine capable of receiving creams or the like, dipping them into a coating fluid, shaking off the surplus coating where required, and depositing the coated bodies out of contact with each other upon a tray or other receiver.

The accompanying drawings illustrate one embodiment of my invention, wherein wire baskets supported on standards moving in an endless path serve to receive the candy centers or drops, dip them into a curved vat containing the coating fluid, shake off any excess coating material, and finally deposit the candies, properly spaced, upon a tray having both a revolving and a lateral movement imparted to it through the medium of a scroll-gear.

In the drawings, Figure 1 is a plan view of the machine; Fig. 2, a plan section taken as indicated at line 2 of Fig. 3; Fig. 3, a view partly in section and partly in elevation, the section being taken as indicated at line 3 of Fig. 1; Fig. 4, an enlarged broken vertical section taken as indicated at line 4 of Fig. 2; Fig. 5, an enlarged broken vertical section taken as indicated at line 5 of Fig. 2; Fig. 6, an enlarged plan view of a guide and a slide thereon which receives the scroll-gear employed; Fig. 7, a transverse section at line 7 of Fig. 6; Fig. 8, an enlarged section at line 8 of Fig. 4, showing a catch for locking a clutch end gear; Fig. 9, a section taken as indicated at line 9 of Fig. 5, and showing a vertical movable journal-block for the shaft which drives the scroll-gear; Fig. 10, a section taken as indicated at line 10 of Fig. 4; Fig. 11. a section on line 11 of Fig. 10; Fig. 12, a perspective view showing two rods employed for automatically starting and stopping the machine; Figs. 13 and 14, enlarged vertical broken sections taken as indicated at the corresponding lines on Fig. 1; Fig. 15, an enlarged fragmentary view showing the shaking mechanism; Fig. 16, an enlarged broken vertical section taken as indicated at line 16 of Fig. 1; Figs. 17, 18, and 19, sections taken at the corresponding lines on Fig. 14; Fig. 20, a perspective view of a segmental gear employed for turning the baskets; Fig. 21, an enlarged broken section taken at line 21 of Fig. 1; Figs. 22 and 23, sectional views indicating two positions of the segmental gear mentioned, the sections being taken as indicated at line 22 of Fig. 21, but showing the segmental gear in position not shown in Fig. 21; Fig. 24, a sectional view taken as indicated at line 24 of Fig. 21 and showing the means for insuring a gradual righting of the baskets after dumping; Fig. 25, a fragmentary view showing a racker engaging the segmental gears for inverting the baskets; Fig. 26, an enlarged sectional view taken at the corresponding line of Fig. 1; Fig. 27, a still further enlarged fragmentary perspective view showing the means for preventing rotation of the segmental gear beyond its normal position before being engaged by said rack; Fig. 28, an enlarged broken view of a guard or cover employed for preventing the body being coated from leaving its basket during the operation of shaking off surplus material; Fig. 29, a development of the circularly-arranged baskets and the parts for acting upon the same during their movement in an endless path; and Fig. 30, an enlarged view showing the cam for effecting an inversion of the baskets.

A represents a main standard which rises from a suitable base A' and supports all the parts of the machine; B, a rotating disk or table centrally supported upon an enlargement B' on the shaft A and provided on its under surface with an annular rack or gear B²; C, a half annular chocolate or coating fluid tank arranged about and slightly below the edge of the disk B and supported upon brackets C' from the standard A; D, peripherally-arranged standards supported by the disk B;

D', vertically-disposed plungers working through guides on standards D; D², springs for maintaining said plungers in a normally raised position; D³, normally horizontal spindles journaled in rotatable heads D⁴, connected with the lower ends of the plungers D', as shown in Fig. 19, and passing at their inner ends through rotatable heads D⁵, connected with the bases of the standards D, as shown in Fig. 14; D⁶, Fig. 27, segmental pinions for rotating the spindles D³; D⁷, restoring-springs secured at their inner ends to said pinions and at their outer ends to the bases of the plungers D'; D⁸, stops projecting from the bases of the plungers D' and serving to hold the pinions D⁶ against rotation under the action of their springs; D⁹, stems projecting from the outer ends of the spindles D³ and bearing baskets D¹⁰; D¹¹, eccentrics secured to the spindles D³ and serving to regulate the movements of the spindles during the righting of the baskets; E, guard-bearing levers pivoted to the standards D at $a$; E', springs for holding said levers normally against pins $a'$, projecting from the standards; E², guards connected with the levers E; F, a fixed ratchet or rack supported upon arms F', secured to the standard A, near the upper end thereof, and serving to engage the upper ends of the plungers D' and effect a shaking of the baskets; F², a cam for effecting depression of the plungers D' and a partial inversion of the baskets during the dipping operation; F³, a cam supported by an arm F⁴, projecting from the standard A and coöperating with a rack F⁵, Figs. 25 and 29, to effect an inversion of the baskets at the point of dumping; F⁶, Figs. 25 and 29, a cam coöperating with the eccentrics D¹¹ to insure a gradual righting of the baskets after inversion; G, a guide supported on a bracket G', projecting from the base of the standard A and receiving a slide G²; G³, a scroll-gear secured to revolve on a central boss $c$ on the slide G² by means of a plate $c'$ and screws $c²$; G⁴, a removable tray or platter supported by the scroll-gear; H, a shaft having at one end a flanged gear H', engaging the scroll-gear, and at the opposite end a beveled gear H², engaging the annular gear B²; H³, a bracket extending from the standard A and supporting a pivoted bearing H⁴ and a vertically-movable bearing H⁵ for the shaft H; H⁶, a rod depending from the bearing H⁵; H⁷, a restoring-spring confined between the bearing H⁵ and the bracket which supports it; H⁸, a connecting-rod depending from the rod H⁶ and joined at its lower end to a foot-lever H⁹, pivoted at one end to the bracket G'; H¹⁰, a rod connected with the slide G² and bearing adjustable stops $d$ $d'$; H¹¹, a guide for the rod H¹⁰, projecting from the bracket H³; I, Figs. 4 and 5, a clutch-operating rod which terminates at one end in an upturned yoke I', which engages the groove of a clutch-member I² on the main shaft I³ of the machine; I⁴, a driving-pulley provided with a clutch member with which the member I² may be thrown into and out of engagement; I⁵, Figs. 4 and 8, a spring-catch secured to the rod I and engaging a rib $e$ on a bracket J, projecting from the main standard A and having at its upper end a bearing for the main shaft I³; I⁶, a link secured to the rod I through the medium of a collar I⁷ and having at its free end a slot $e'$, which receives the short arm $e²$, Figs. 4 and 12, of a bell-crank-shifting lever I⁸; I⁹, a support projecting from the bracket H³ and having pivoted thereto by means of a screw $f$ the bell-crank lever I⁸; I¹⁰, a link pivoted to the free end of the long arm of the bell-crank I⁸ and having upturned ends $f'$ $f²$, the latter of which is perforated to receive the rod H¹⁰; I¹¹, Fig. 4, a beveled gear on the main shaft and engaging the gear B²; K, a stationary cam supported from the main standard A and serving to raise the guards E² from the baskets D¹⁰ and hold them away from the baskets during the movements of inversion, righting, and dipping; L, Figs. 1, 2, and 3, stirring devices located in the tank C and connected by a cable $g$; L', hinged supports, in which are journaled the shafts of said stirrers, and L² a wheel having notches for engaging lugs $h$ on the standards D.

The manner of supporting the stirrer-shaft is best shown in Fig. 3, from which figure it will be seen that the supports may be moved up about their pivotal points to remove the stirrers from the tank.

The disk B is held in place by a plate $i$, as shown in Fig. 4. The manner in which the journal-box H⁵ is made vertically movable is best shown in Fig. 9, where studs $j$ are shown as projecting laterally from the box and movable in slots $k$ in the divided head of the bracket H³.

Fixed to the guide G is a stop $l$, having its inner end upcurved and laterally bent to engage the slide G² when the latter is at the inner end of its traverse. This affords a positive stop which limits the inward movement of the scroll-gear when the latter is shoved in to start the machine in operation.

In Fig. 2 the rod I is shown terminating in a handle $l'$, and when desired this handle may be employed to throw the machine into or out of gear.

In Fig. 3 the cam F⁶ is shown supported from the bracket H³ by a stem $l²$.

As shown in Figs. 2 and 4, the tank or vat C is practically divided into two portions to make room for the shaft I³. The main part of the vat serves to receive the chocolate and the small portion serves to receive drippings only.

As shown clearly in Fig. 15, the upper ends of the plungers D' are inclined upwardly and in a direction the reverse of the direction in which they are carried during the movement of the table D. The teeth of the rack F are correspondingly inclined, and as the plungers move beneath the rack they receive a jolting motion, due to the action of the ratchet-teeth and the plunger-springs. As shown most clearly in Figs. 22 and 27, one tooth of each segmental gear $D^6$ is provided with a laterally-projecting lug $m$, which serves in one position to engage the stop or pin $D^8$ and hold the pinion against too great a rotation under the action of its spring and in another position to engage a cam-surface $m'$, Fig. 22, to hold the pinion in a rotated position after it has been moved to that position by engagement with the rack $F^5$.

Fig. 25 shows the cam $m'$ ending in an abrupt shoulder $m^2$, off which the lug $m$ drops at the moment the eccentric $D^{11}$ is in position to engage the cam $F^6$, through the medium of which a gradual return movement of the pinion is secured.

As best appears from Fig. 18, the plungers $D'$ are out of line with the spindles $D^3$ and the stop $D^8$ projects laterally above the lug $m$ on the pinion $D^6$, and as the pinion $D^6$ is rigidly fixed to the spindle $D^3$ it follows that when the plunger is moved downward a rotation of the pinion, and consequently of the spindle, are secured. The spring $D^7$ serves, of course, to resist this motion and to return the spindle to its former position when the plunger rises. To permit the downward movement of the plunger, the spindle $D^3$ is allowed to move longitudinally in its pivotal head or bearing $D^5$.

As shown in Fig. 17, a stop or rest $n$ is provided on the stem of the guard $E^2$, and this bears upon the stem $D^9$, supporting the basket $D^{10}$, during certain parts of the operation.

In practice a table is supplied for the operator at the location indicated at M in Fig. 1, though none is shown in the drawings. During the time that the baskets are passing the location at M they are in an upright position and ready to receive the creams or other bodies to be coated. In Fig. 29 the direction of rotation of the machine is indicated by the arrow. As the baskets pass in succession before the operator they are filled and are then immediately plunged into the liquid in the tank C by means of the cam $F^2$ engaging the upper ends of the plungers, thereby depressing the plungers, tilting the stems $D^9$ downward, and rotating them somewhat, as shown at $p$. The purpose of partially inverting the baskets is to prevent the bodies of cream from being washed or floated from their baskets. As soon as the cam $F^2$ is passed the plungers rise under the action of their springs, raising the baskets from the liquid. As the plungers pass beneath the rack F they are agitated or shaken, and during this portion of the operation the guards $E^2$ cover the baskets, the stops or rests $n$ bearing at this time on the stems $D^9$. As will appear from Fig. 29, that end of the cam K which first engages the levers E is upcurved, so that the inner ends of the levers can pass beneath the cam and be depressed, thereby raising the guards clear from the baskets during the operation of inverting the baskets. As soon as the baskets pass the point M the inner ends of the levers E pass from beneath the cam K and are drawn up by their springs until stopped by the studs $a'$. When the baskets rise after being plunged into the bath of coating fluid, the stems $D^9$ come up beneath the rests $n$ of the guards and lift the guards so that the inner ends of the levers E are out of engagement with the studs $a'$ during the movement of shaking described. The guards are therefore in position during the operation of shaking to prevent the bodies of cream from being shaken from their baskets, and at the same time the guards do not press down upon the cream-bodies. Soon after the plungers pass from beneath the rack F at the point $p'$ (indicated in Fig. 29) they are engaged by the cam $F^3$ and pressed downwardly, so that the pinions $D^6$ engage the rack $F^5$ and cause a partial rotation of the baskets, so that their contents are deposited upon the tray or receiver. At the instant of depositing the drops the baskets are in close contact with the receiving-surface, as indicated in Fig. 5. Immediately after the inversion becomes complete the plunger passes from beneath the cam $F^3$ and the basket is quickly elevated, being held against reversal or righting, however, by engagement of the lug $m$ with the cam-surface $m'$. This last-named feature of the construction serves the important purpose of preventing the drop from being struck by the basket during the reversal or righting operation. Fig. 22 shows the position of a pinion shortly after the corresponding plunger has been engaged by the cam $F^3$. Fig. 23 shows the position after the pinion has been partially rotated and while it is being carried a certain distance from the point of depositing the drop. Fig. 24 shows the eccentric $D^{11}$ about to engage the cam $F^6$, and this position corresponds to the position where the lug $m$ of the pinion passes from the cam-surface $m'$, as shown in Fig. 25. It will be noted that the eccentric can only rotate under the force of the spring tending to return the basket to its original position, as the cam-surface over which it is passing permits this movement. The dotted line in Fig. 24 indicates the path of the stem bearing the eccentric.

The gear $H^2$ bears such relation to the gear $H'$ as to give to the scroll-gear such speed of rotation as to properly space the drops which it receives, the spacing between the drops radially of the tray being determined by the spacing between the rows of teeth of the scroll-gear. It will be understood that the first drop is deposited at the center of the tray and that as the gear $H'$ rotates the scroll-gear its flange at the same time forces the gear outwardly on its slide. When the slide has moved a sufficient distance to bring the collar $d'$ into engagement with the inner end of the link $I^{10}$, the bell-crank $I^8$ is moved to throw the machine out of gear. After the filled tray has been replaced by an empty one the gear $H'$ may be moved out of engagement with the scroll-gear by depressing the foot-lever $H^9$, and the scroll-gear may then be shoved inwardly till the stop $d$ engages the outer end of the link $I^{10}$ and starts the machine.

In practice the candies are received on sheets of waxed paper placed on the trays and after being left in the cooling-room for a time to harden can be readily removed and the trays returned for use again.

The cam $F^2$ is shown constructed with a swinging portion, which is secured by a screw $q$. The hinged part may be raised to permit the plungers to rise at an accessible point for repair of springs or the like. If desired, the rack F may be supported independently of the cam $F^2$, allowing a vertical adjustment of the rack to regulate the shaking force.

The machine may be variously modified without departure from my invention, the essential features shown being believed to be broadly novel in the art. The tray, for instance, may be replaced by any suitable form of receiver for automatically conveying the candies from the machine. Also any suitable holders may replace the baskets for holding the candies and dipping them into the immersing-tank, and where the bodies to be dipped are of a nature to permit automatic feeding mechanism may be provided for filling the holders. Obviously, each spindle or shaft $D^3$ may be equipped with as many cups for receiving creams as may be desired, the shafts themselves being of any desired proportions and journaled and controlled in any suitable manner to enable them to partake of the essential movements in dipping the holders, shaking the same, then inverting the holders to discharge the holder contents, and finally righting the holders to permit new charges to be introduced. While the shafts have both a longitudinal and swinging movement during the shaking operation, this movement may be modified as desired, it being characteristic of the construction that the holders are fixed to and shaken through the medium of their shafts, the latter being orbitally carried, preferably by a rotating carrier on which they are supported, and independently rotatable to permit them to be reversed or inverted and then righted or restored to their original positions. While the holders have preferably in addition to their orbital movement a dipping movement independent of the movement of the carrying member which depresses them out of the general plane of their orbital movement, yet this independent dipping movement may be varied without sacrificing certain of its inherent advantages. It is noteworthy, also, that the form of the rotating table or holder-carrier may be varied without departure from my invention.

The holders or dipping elements may be otherwise characterized as having an orbital movement and an individual independent horizontal rotation or partial rotation, the term "orbit" being used in the sense of an endless path. The charge-holder proper is detachable from the remainder of the dipping element, and the guard $E^2$ coacts with the holder proper, so that the two may be regarded as a pair of independently-movable parts for the purpose described. That portion of the receiver, tray, or conveyer which is adjacent to the holders at the point of discharge has a movement in the same general direction as the holders at such point, whereby the charges are readily deposited without injury from any difference in rate of speed.

I have shown an immersing-tank with double walls for receiving steam or hot water for keeping the coating fluid warm; but any other expedient may be adopted for this purpose.

What I claim as new, and desire to secure by Letters Patent, is—

1. In a machine of the character described, the combination of a tank or receptacle for the coating fluid, holders or dipping elements for the bodies to be coated, and mechanism for moving the holders or dipping elements in an endless path about a vertical axis and lowering them into and raising them out of said tank or receptacle.

2. In a machine of the character described, the combination of a tank or receptacle for the coating fluid, holders or dipping elements for the bodies to be coated, mechanism for moving the holders or dipping elements in an endless path about a vertical axis and for lowering the holders into and raising them out of said tank or receptacle, and mechanism for emptying the holders, or dipping elements.

3. In a dipping-machine, the combination of a tank or receptacle for containing coating materials and a plurality of holders or dipping elements having a continuous horizontal orbital movement and an automatic depression into said tank or receptacle individually during said movement.

4. In a dipping-machine, the combination of a tank or receptacle for containing the coating material, a plurality of orbitally-carried holders or dipping elements having an automatic depression into said receptacle, and means for relieving the charges carried by the said holders or dipping elements from a surplus of the coating material.

5. In a machine of the character described, the combination of a tank or receptacle for the coating fluid, holders or dipping elements for the bodies to be coated, mechanism for moving the holders or dipping elements in an endless path about a vertical axis, and for lowering said holders or dipping elements into and raising them out of said tank or receptacle, and mechanism for inverting the holders or dipping elements to discharge their contents.

6. In a dipping-machine, the combination of a rotary hub, frame or disk, a plurality of horizontally-disposed orbitally-moving radially-arranged holders or dipping elements loosely mounted in connection therewith to have both an orbital and an automatic depressing movement, and means for operating the parts.

7. In a machine of the character described, the combination of a tank or receptacle, individual holders or dipping elements supported to move in an endless path about a vertical axis, mechanism for dipping the holders or dipping elements successively into the bath, mechanism for effecting a discharge of the holder contents in succession and a moving tray or receiver, conveyer or belt upon which the drops are deposited and properly spaced.

8. In a machine of the character described, the combination of a stationary tank or receptacle, a rotating horizontally-disposed table or support, holders or dipping elements peripherally arranged on said table or support and adapted to be lowered and immersed in a bath in said tank or receptacle, and mechanism for effecting a discharge of the holder contents.

9. In a machine of the character described, the combination of a stationary tank or receptacle, a rotating table or support, holders or dipping elements peripherally arranged on said table or support and adapted to be lowered and immersed in a bath in said tank or receptacle, mechanism for effecting a discharge of the holder contents, and a tray or receiver, conveyer or belt geared to move at a given speed relatively to the movement of said table or support.

10. In a dipping-machine, a plurality of individual orbitally-moving holders or dipping elements each having an automatic depression in the course of its orbital movement, all of said holders or dipping elements having removable charge-holders provided with seats.

11. In a dipping-machine, a plurality of individual horizontally-moving orbitally-carried holders or dipping elements each having an automatic depression in the course of its orbital movement, and each comprising a rod having an independent turning movement and terminally provided with a detachable charge-holder, and another rod with a retention device to coact with the said holder.

12. The combination of a stationary tank or receptacle, a rotating table or support having a vertical axis of rotation, holders or dipping elements carried by said table or support, mechanism for immersing the holders and a rotating stirrer located in said tank or receptacle, and having a vertical axis of rotation.

13. In a dipping-machine, the combination of a plurality of horizontally-disposed orbitally-carried holders or dipping elements, a tank or receptacle for containing coating material and into which the said holders or dipping elements have an automatic depression, and a vibrator or rack across which the holders or dipping elements individually move for relieving the coated charges of surplus coating material.

14. A dipping-machine having a plurality of horizontally-disposed continuously-moving orbitally-carried holders or dipping elements, movable around a common center and which are automatically depressed toward coating material at one point in the course of their travel.

15. A dipping-machine, having a plurality of horizontally-disposed continuously-moving orbitally-carried holders or dipping elements, each having an automatic depression in the course of its orbital movement and arranged to carry a single core to be dipped.

16. A dipping-machine having a plurality of horizontally-disposed continuously-moving orbitally-carried holders or dipping elements, each having an automatic depression in the course of its orbital movement, and each also comprising a pair of independently-movable parts for carrying a single core to be dipped.

17. A dipping-machine comprising a plurality of horizontally-moving orbitally-carried holders or dipping elements, a portion of each being revoluble, and a horizontally-disposed movable tray or receiver, conveyer or belt, over which the terminals of the holders or elements have movement to individually deposit the finished article carried thereby.

18. A dipping-machine comprising a plurality of continuously horizontally moving orbitally-carried holders or dipping elements, a portion of each being revoluble, and a movable tray or receiver, conveyer or belt, having a portion of its surface moving beneath and in the same general direction as the holders at the point of discharge and serving to receive the finished articles deposited by the holders.

19. In a dipping-machine, the combination of a plurality of orbitally-carried holders or dipping elements having movement around a common axis, a freely-removable tank or receptacle for containing coating material and into which said elements automatically depress in succession, and means for operating the said parts.

20. In a machine of the character described, the combination of a tank, baskets supported to move in an endless path, mechanism for dipping and partially inverting the baskets at the bath, and mechanism for inverting the baskets at the point of discharge and then righting them, substantially as described.

21. In a machine of the character described, the combination of a tank, holders supported to move in an endless path, mechanism for moving the holders, a movable receiver for the drops, and means connected with said receiver for stopping the machine when the receiver is filled, substantially as described.

22. In a machine of the character described, the combination of a tank, holders supported to move in an endless path, mechanism for moving the holders, a movable receiver for the drops, and means connected with the receiver for automatically starting the machine when the receiver is moved by the operator to its proper position for receiving the first drop, substantially as described.

23. The combination with a tank, holders supported to move in an endless path, mechanism for immersing the holders in a bath in the tank, and mechanism for effecting a discharge of the holder contents, of a receiver comprising a scroll-gear, a tray carried thereby, and gear mechanism for revolving and giving lateral movement to the scroll-gear, substantially as described.

24. The combination of a tank, a rotating disk, peripherally-arranged holders adapted to be immersed in a bath in said tank, gear mechanism for rotating said disk, a guide, a slide mounted thereon, a scroll-gear carried by said slide, and gear mechanism connecting the scroll-gear to the disk-driving mechanism, substantially as described.

25. The combination of an immersing-tank, a rotating disk, gear mechanism for moving said disk, peripherally-arranged holders, mechanism for dipping the holders, a scroll-gear bearing a receiver and having a rotary and lateral movement, gear mechanism connecting the scroll-gear with the disk-actuating gear mechanism, and means connected with and moved by the scroll-gear for stopping the machine when the receiver is filled, substantially as described.

26. The combination of an immersing-tank, a disk, peripherally-arranged holders carried by said disk, mechanism for dipping said holders, a main driving-shaft, a device for throwing said shaft into and out of gear, a shifting rod connected with said device, a guide extending at an angle to the main shaft, a slide mounted thereon, a scroll-gear mounted on said slide, gear mechanism for imparting motion to the scroll-gear, a rod movable with said slide, and means carried by said last-named rod for moving said shifting rod, substantially as described.

27. The combination of an immersing-tank, a disk, peripherally-arranged holders carried by said disk, mechanism for dipping said holders, a main driving-shaft, a device for throwing said shaft into and out of gear, a shifting rod connected with said device, a guide extending at an angle to the main shaft, a slide mounted thereon, a scroll-gear mounted on said slide, gear mechanism for imparting motion to the scroll-gear, a rod movable with said slide, lever mechanism connected with said shifting rod, and means on the rod moving with said slide for engaging and moving said lever mechanism, substantially as described.

28. The combination of an immersing-tank, a rotating disk, plungers moving in guides carried by said disk, holders supported from said plungers, and a stationary cam arranged above the path of said plungers and serving to depress the same to dip said holders, substantially as described.

29. The combination of an immersing-tank, a rotating disk, standards carried thereby, plungers movable in guides, spindles pivotally connected with the lower ends of said plungers and projecting each at an angle to its respective plunger, means for yieldingly holding said spindles in a given position, and a stationary cam located above the path of said plungers and serving to depress the same, substantially as and for the purpose set forth.

30. The combination of an immersing-tank, a rotating disk, standards carried thereby, plungers movable in guides, spindles pivotally connected with the lower ends of said plungers and projecting each at an angle to its respective plunger, means for yieldingly holding said spindles in a given position, a stationary cam located to depress said plungers and thereby immerse and partially invert said holders, and a stationary cam for depressing said plungers at the point of discharge, substantially as and for the purpose set forth.

31. The combination of an immersing-tank, a rotating disk, standards carried thereby, plungers movable in guides, spindles pivotally connected with the lower ends of said plungers and projecting each at an angle to its respective plunger, means for yieldingly holding said spindles in a given position, a stationary cam located to depress said plungers and thereby immerse and partially invert said holders, a stationary cam for depressing said plungers at the point of discharge, pinions on said spindles, and a rack located beneath said last-named cam and coacting therewith and with said pinions in effecting an inversion of the holders, substantially as and for the purpose set forth.

32. The combination of an immersing-tank, a rotating disk, standards carried thereby, plungers movable in guides, spindles pivotally connected with the lower ends of said plungers and projecting each at an angle to its respective plunger, means for yieldingly holding said spindles in a given position, a stationary cam located to depress said plungers and thereby immerse and partially invert said holders, a stationary cam for depressing said plungers at the point of discharge, pinions on said spindles, a rack located beneath said last-named cam and coacting therewith and with said pinions in effecting an inversion of the holders, and means for insuring a slow return of the holders to their righted position, substantially as and for the purpose set forth.

33. The combination of an immersing-tank, a rotating disk, plungers moving in guides carried by said disk, pivotal heads connected with the lower ends of said plungers, spindles pivotally connected with said heads, pivotal heads carried by said disk and slidably receiving the inner ends of said spindles, springs for yieldingly holding the spindles in a given position, springs for holding the plungers in their raised position, and a cam located above the path of said plungers and serving to depress the plungers, substantially as and for the purpose set forth.

34. The combination of a stationary immersing-tank, a rotating disk, holders carried by said disk, mechanism for lowering the holders into the bath, raising them therefrom and then shaking them, and spring-held guards for closing said holders after immersion, substantially as and for the purpose set forth.

35. The combination of an immersing-tank, a rotating disk, holders carried by said disk, mechanism for immersing and shaking the holders, spring-held guards for closing said holders, and stationary cams for raising said guards from their holders preparatory to a discharge of the holder contents, substantially as and for the purpose set forth.

36. The combination of an immersing-tank, a rotating disk, holders carried by said disk and projecting from the periphery thereof, mechanism for depressing said holders into a bath, a rack arranged above and near the periphery of said disk, and spring-held plungers connected with said holders and engaging said rack and serving to shake the holders after immersion, substantially as and for the purpose set forth.

37. The combination of an immersing-tank, a rotating disk, vertically-movable plungers in guides carried by said disk, pivotal heads connected with the lower ends of said plungers, spindles pivoted in said pivotal heads, holders carried by said spindles, pivotal heads connected with the guides carried by said disk and slidably receiving the inner ends of said spindles, pinions on said spindles provided with lugs, stops on said plungers engaging said lugs, springs on said spindles serving normally to hold said lugs in contact with said stops, eccentrics carried by the spindles, cams for depressing the plungers at the desired points, a rack coöperating with one cam and with said pinions to invert the holders, a cam for engaging the lugs on said pinion to retain the holders for a time in an inverted position, and a cam for engaging said eccentrics to insure a slow movement in the righting of the holders under the action of the springs on their spindles, substantially as described.

38. The combination of an immersing-tank, a rotating disk, holders carried by said disk, mechanism for immersing the holders, a stirrer located in said tank, and a wheel for operating said stirrer located to be engaged by projections on said disk, substantially as described.

39. The combination of an immersing-tank, a rotating disk, holders peripherally arranged on said disk, mechanism for depressing the holders into a bath, a stirrer located in said tank, a wheel for operating said stirrer engaged by projections on said disk, a support for said stirrer and wheel, and pivotal connection between said support and said tank whereby the stirrer and its support may be swung out of its normal position, substantially as and for the purpose set forth.

40. The combination of an immersing-tank, a rotating disk, holders carried by said disk, mechanism for immersing the holders in a bath, mechanism for inverting the holders at the point of discharge, a guide projecting laterally, a slide mounted thereon, a scroll-gear carried by said slide, a gear connected with said disk to rotate therewith, a shaft for communicating motion to said scroll-gear and receiving its motion from the gear on said disk, a pinion on said shaft and in engagement with said scroll-gear, and movable bearings for said shaft permitting said pinion to be moved free from engagement with said scroll-gear, whereby said scroll-gear may be returned to its starting-point, substantially as and for the purpose set forth.

41. The combination of an immersing-tank, a rotating disk, holders carried by said disk, mechanism for immersing the holders in a bath, mechanism for inverting the holders at the point of discharge, a guide projecting laterally, a slide mounted thereon, a scroll-gear carried by said slide, a gear connected with said disk to rotate therewith, a scroll-gear-actuating shaft, pinions on said shaft engaging respectively the gear on said disk and the scroll-gear, a pivoted bearing for the inner end of said shaft, a vertically-movable bearing for the outer end of said shaft, and means for depressing the outer end of the shaft, substantially as and for the purpose set forth.

42. In a dipping-machine, the combination of a fluid-receptacle, a suitably-actuated carrier provided with a holder-bearing which moves with the carrier, an invertible holder supported in said bearing and invertible independently of said carrier, means for shaking said holder while it is being carried by the carrier, and means for automatically inverting said holder to discharge the holder contents.

43. In a dipping-machine, the combination of a fluid-receptacle, a suitably-actuated carrier provided with a holder-bearing, an invertible holder having a shaft supported in said bearing, said holder being invertible independently of said carrier, means for shaking said holder through the medium of its shaft, and automatic means for turning said holder in its bearing through the medium of the holder-shaft.

44. In a dipping-machine, the combination of a fluid-receptacle, a suitably-actuated carrier provided with an orbitally-moving holder-bearing, an invertible holder supported in said bearing and carried thereby in an endless path, said holder being invertible independently of said carrier, means for shaking said holder, and automatic inverting means for said holder, for the purpose set forth.

45. In a dipping-machine, the combination of a stationary fluid-receptacle, a suitably-actuated carrier provided with an orbitally-moving holder-bearing, a holder journaled in said bearing and carried thereby in an endless path, and a stationary cam imparting to said holder a movement independent of the carrying movement of said carrier.

46. In a dipping-machine, the combination of a fluid-receptacle, a suitably-actuated carrier supplied with an orbitally-moving holder-bearing, a holder journaled in said bearing and equipped with a pinion and carried by said carrier in an endless path, and a stationary rack operating to turn said pinion and invert said holder, for the purpose set forth.

47. In a dipping-machine, the combination of a fluid-receptacle, a suitably-actuated carrier supplied with an orbitally-moving holder-bearing, an independently-invertible holder journaled in said bearing and equipped with a pinion and carried by said carrier in an endless path, and a stationary cam and stationary rack controlling the holder during the dipping and inverting movements thereof, for the purpose set forth.

48. In a dipping-machine, the combination of a fluid-receptacle, a suitably-actuated carrier supplied with an orbitally-moving holder-bearing, an invertible holder journaled in said bearing and equipped with a pinion and carried by said carrier in an endless path, and a cam, holder-vibrating rack, and pinion-engaging rack operating on said holder and controlling the dipping, shaking and inverting of said holder, for the purpose set forth.

49. In a dipping-machine, the combination of a rotating carrier, longitudinally-movable orbitally-carried independently-rotatable shafts mounted on said carrier, a fluid-receptacle, holders carried by said shafts and fixed to partake of their independent turning movements, means for controlling the independent movements of said shafts during the dipping operation, means for shaking the shafts to agitate the holders, and means for turning the shafts to discharge the holder contents, for the purpose set forth.

50. In a dipping-machine, the combination of a rotating carrier, longitudinally-movable orbitally-carried independently-rotatable shafts mounted on said carrier, a fluid-receptacle, holders carried by said shafts and fixed to partake of their independent turning movements, means for controlling the independent movements of said shafts during the dipping operation, means for shaking the shafts to agitate the holders, and means for turning the shafts both to invert the holders and then restore them to their original positions, for the purposes set forth.

51. In a dipping-machine, the combination of a fluid-receptacle, a rotating carrier, orbitally-carried spring-held longitudinally-movable independently-rotatable shafts mounted on said carrier, holders fixed to said shafts, means for moving said shafts to agitate the holders, and means for reversing said shafts to discharge the holder contents, for the purpose set forth.

52. In a dipping-machine, a stationary tank and a suitably-actuated carrying member, in combination with a plurality of orbitally-moving holders, or dipping elements, carried thereby, each holder having an automatic depression in the course of its orbital movement independent of the movement of said carrying member, the resultant movement causing the holder to pass through the stationary tank, for the purpose set forth.

53. In a dipping-machine, the combination of a fluid-receptacle, a suitably-actuated carrier supplied with an orbitally-moving holder-bearing, an invertible holder journaled in said bearing and equipped with a pinion and carried by said carrier in an endless path, and a cam, toothed holder-vibrating member, and pinion-engaging rack operating on said holder and controlling the dipping, shaking and inverting of said holder, for purpose set forth.

54. A dipping-machine having a stationary fluid-receptacle and a plurality of orbitally-moving holders, or dipping elements, each having an automatic depression in the course of its orbital movement for immersion at the bath, in combination with automatically-actuated orbitally-moving retainers, or guards, constructed and operated to automatically close and unclose the holders so as to retain the holder contents during immersion and permit the discharge thereof after immersion, for the purpose set forth.

55. In combination, a stationary fluid-receptacle, a plurality of horizontally-disposed orbitally-carried holder-shafts equipped with holders, means for depressing said shafts out of their orbital movement to immerse the holders, orbitally-carried retainer-shafts equipped with retainers and each extending substantially parallel with a holder-shaft and coacting therewith, and means for depressing said retainer-shafts in conjunction with the depression of the holder-shafts, for the purpose set forth.

SIMEON J. HICKS.

In presence of—
  JOHN W. HICKS,.
  O. BURNS HICKS.